United States Patent [19]

Heck

[11] Patent Number: 5,083,728
[45] Date of Patent: Jan. 28, 1992

[54] ROCKET ENGINE NOZZLE THROAT PLUG ENGINE RECOVERY SYSTEM

[76] Inventor: Gordon Heck, 2255 Pleasant Valley Rd., Lamar, Calif. 90310

[21] Appl. No.: 608,175

[22] Filed: Oct. 31, 1990

[51] Int. Cl.$^5$ .................... B64G 1/62; B64D 45/00
[52] U.S. Cl. .................... 244/160; 244/138 R; 244/121
[58] Field of Search .................... 244/138 R, 160, 1 R, 244/146, 121; 239/288

[56] References Cited

U.S. PATENT DOCUMENTS

| | | | |
|---|---|---|---|
| 3,286,951 | 11/1966 | Kendall | 244/160 X |
| 4,830,314 | 5/1989 | Hujsak | 244/160 X |
| 4,832,288 | 5/1989 | Kendall et al. | 244/160 |
| 4,961,550 | 10/1990 | Hujsak | 244/138 R |

Primary Examiner—Joseph F. Peters, Jr.
Assistant Examiner—Carla Mattix
Attorney, Agent, or Firm—Roger A. Marrs

[57] ABSTRACT

An expandable throat plug for use in the recovery of a rocket engine nozzle in an engine assembly is disclosed herein having a deployment device carried on the exterior of the engine assembly including an actuator for advancing an extendable column and an arm normal thereto so that the expandable throat plug can be deployed into and inside the nozzle. A telescoping extension shaft deploys the plug interiorly of the nozzle whereby a pressurized medium expands the plug into conformal engagement with the inner surface of the nozzle to seal and close the throat opening.

6 Claims, 2 Drawing Sheets

ROCKET ENGINE NOZZLE THROAT PLUG ENGINE RECOVERY SYSTEM

BACKGROUND OF THE INVENTION

1. Field of the Invention

The present invention relates to the field of space equipment recovery systems and more particularly to a novel recovery means for permitting the recovery of a jettisoned rocket engine having an expandable throat plug adapted to be carried by and positioned in the nozzle throat for a contamination-free recovery.

2. Brief Description of the Prior Art

It is the current practice in rocket and missile technology to jettison the rocket engine after initial liftoff and flight. The jettisoned rocket engine is either sacrificed by allowing it to drop and be lost in the ocean or in more recent practice, the engine can be lowered by parachute and recovered subsequently after landing.

In the latter instance, problems and difficulties have been encountered which stem largely from the fact that the rocket engine is damaged because of impact and is oftentimes lost when dropped into the ocean because of sinking. Inasmuch as rocket engines are extremely expensive, it is very useful and desirable to recover the engine assembly without damage and with ease of location by employing convenient recovery measures.

Therefore, a long-standing need has existed to provide a means for protecting an engine assembly upon impact and which will permit the jettisoned engine assembly to be completely closed off from all contamination.

SUMMARY OF THE INVENTION

Accordingly, the above problems and difficulties are obviated by the present invention which provides a novel means for permitting the recovery of a jettisoned rocket or missile engine which includes an inflatable or expandable means carried exteriorly of the engine assembly including a nozzle when jettisoned and which further includes an extendable means for carrying the expandable means into the interior of the nozzle for placement in the narrowest portion of the nozzle or throat portion. A release mechanism is provided for applying a pressurized medium to the expandable means so that the latter means is expanded to occupy the inner throat of the nozzle and to engage in conformal relationship with the inside surface of the combustion chamber and throat of the nozzle. Actuators are provided in operable connection with the extendable means for advancing the extendable means so that the expandable means is properly and securely located. In one form of the invention, the extendable means may take the form of telescoping sections of coaxial tubes and certain tubes are pivotally connected together to permit extension at right angles to the length of other telescoping tubes.

Therefore, it is among the primary objects of the present invention to provide a novel recovery means for a jettisoned rocket or missile engine assembly which will permit the nozzle to float upon impact with a water body and which will reduce mechanical and physical damage to the structure of the nozzle upon such impact.

Another object of the present invention is to provide a novel recovery means for a jettisoned rocket or missile engine that is relatively inexpensive and which will include automatically operated actuators and pressurized sources to position and energize an expandable member so that the structure of the nozzle is supported and so that the engine assembly will float in a body of water.

Yet another object of the present invention is to provide a novel means for protecting and supporting a released engine assembly which includes an expandable reinforcing member positioned within the nozzle so as to conform with the construction of the nozzle whereby the structure is reinforced and is floatable in a body of water.

A further object of the present invention is to provide a novel and inexpensive means carried on an engine assembly for saving the engine assembly for future use after an initial liftoff and initial flight usage.

Still another purpose of this invention is to save the entire engine assembly, i.e. oxidizer and fuel pumps, gas generator, all ducting and lines, valves and the injector/combustion chamber as well as the thrust nozzle. All openings can be readily closed off using valves except the nozzle throat through which contaminants can enter the internal portions of the engine via the injector.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
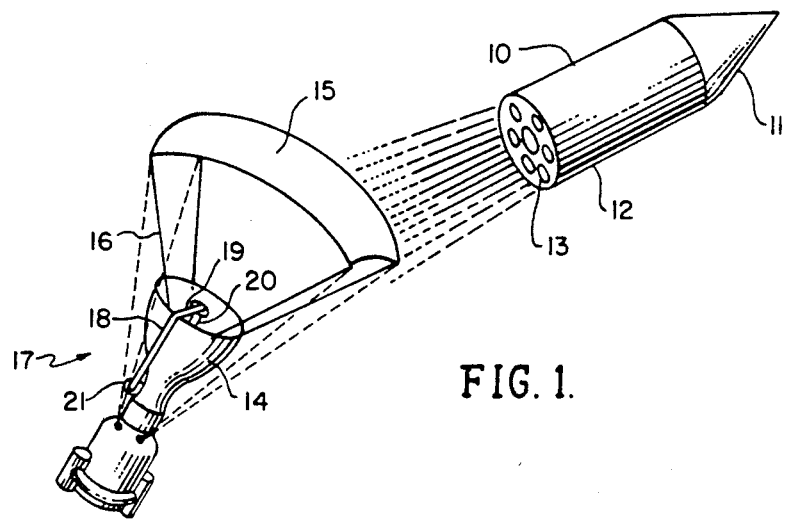
FIG. 1 is a diagrammatic view illustrating a launched rocket with the engine assembly having been jettisoned and which is being lowered by parachute.

Referring to FIG. 1, a conventional rocket or missile is indicated by the numeral 10 which includes a nose cone 11 and a tail or afterportion 12. The rocket or missile may be a space vehicle that is manned or unmanned and the vehicle itself does not form a part of the present invention. However, it is noted that the vehicle 10 includes a plurality of rocket engines, such as is indicated by numeral 13, and thrust nozzles, indicated by numeral 14. Upon reaching a prescribed distance, the engine assembly 13 is released and jettisoned from the tail or afterportion 12 so that it is completely separated from the vehicle 10. In order to effect recovery, a parachute canopy 15 is suitably attached to the nozzle 14 or to an engine mid point adapter ring by a plurality of shrouds 16 so that the engine assembly 13 is floatably supported during descent towards a body of water from which the engine assembly may be recovered and reused.

The recovery apparatus of the present invention is indicated in the general direction of arrow 17 and includes a telescoping extendable column 18 terminating at one end in a telescoping arm 19 and a telescoping downwardly extending shaft 20 interiorly located with respect to the nozzle 14. The opposite end of the telescoping column includes an actuating and pressurization means 21 that is suitably attached to the engine assembly 13.

Figure 2:
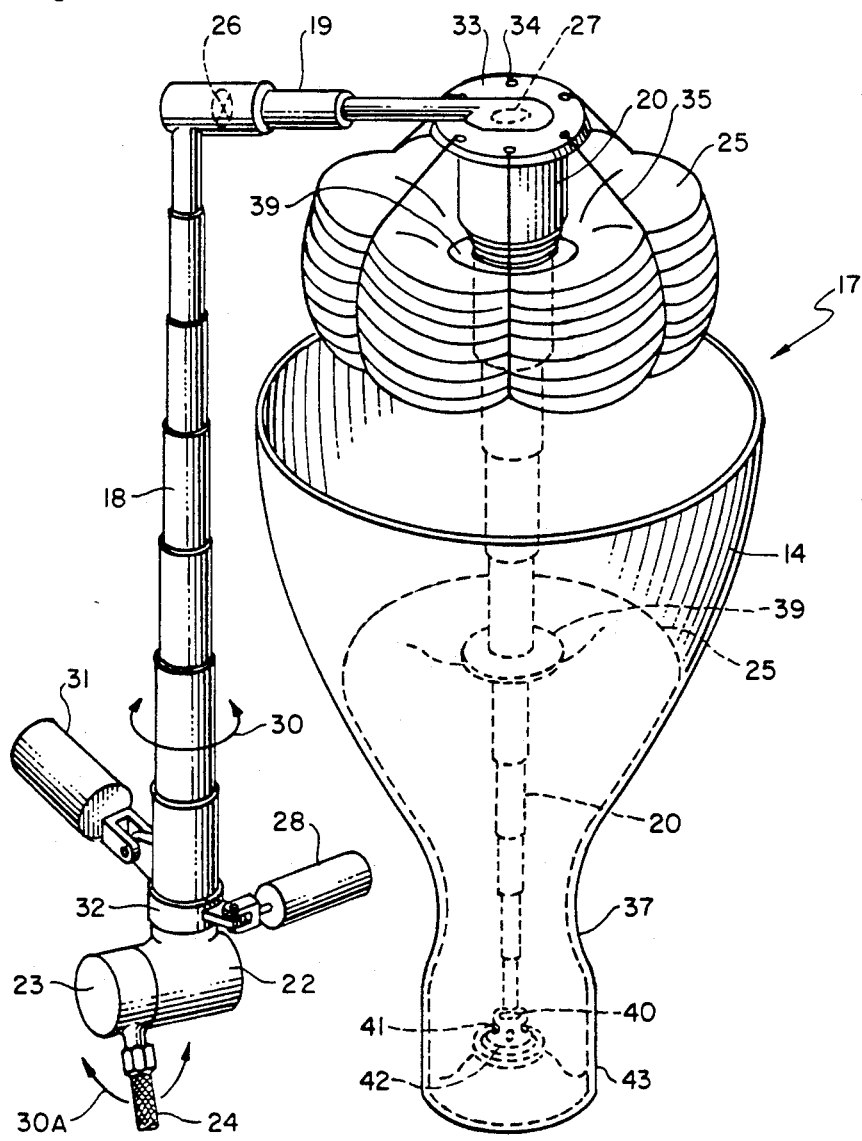
FIG. 2 is an enlarged prospective view of the novel rocket or missile engine assembly recovery means incorporating the present invention.

Referring now in detail to FIG. 2, it can be seen that the actuating means includes a main pivot 22 which carries a rotary union 23 attached to one end of a pressurization source via hose 24. The pressurization source includes a quantity of pressurant which is conducted through the column 18 and arm 19 for introduction into an expandable throat plug 25. The pressurant conducted by the column and arm is effective to rupture diaphragms 26, 27 and 40 in order to extend the telescoping arm 19 and the extension shaft 20, as well as to expand the throat plug 25.

While the rocket or missile 10 is in flight, the throat plug and the rest of the recovery mechanism is stowed adjacent to the nozzle but does not interfere with the operation of the engine itself. Once the engine assembly is no longer in use and prior to being jettisoned, the expandable throat plug 25 is positioned as shown in solid lines in FIG. 2 so as to be coaxially disposed with respect to the axis of the nozzle 14. The disposition of the throat plug is achieved by erection of the column 18 assemblage from a stowed horizontal position to one parallel to the engine/nozzle axis which is achieved by actuator 31 and subsequent pressurization of column 18. Disposition of the throat plug over the throat axis is achieved by rotation of column by the actuator 28 and increased pressurization to burst rupture diaphragm 26 allowing the arm to fully extend, bringing the throat plug in line with the throat axis. Placement of the throat plug 25 into the nozzle is achieved by increased pressurization to rupture diaphragm 27 causing the extension shaft 20 and throat plug to extend into the main combustion chamber 43, nozzle throat 37 and nozzle 14. Expansion of throat plug is achieved by increased pressurization to rupture diaphragm 40 allowing throat plug to expand and effect a firm seal in the nozzle. Numerals 30 and 30A illustrate the reciprocal movements of actuators 28 and 31. Both of the actuators 28 and 31 are pivotally coupled to the column 18 and the swivel 32 respectively.

FIG. 2 also shows that the arm 19 comprises a telescoping component terminating in a plate or head 33 carrying the diaphragm 27 and having a plurality of holes, such as hole 34, arranged about its peripheral edge. The holes are used to employ fasteners connecting one end of a plurality of breakaway ties, such as tie 35, while the opposite end of each breakaway tie is connected by a fastener to the lower plate 42 carried on the end of extension shaft 20. The opposite end of extension shaft 20 is fixedly secured to the underside of the upper plate 33. Therefore, upon the extension of the shaft 20 from its storage position in solid lines to its extended position illustrated in broken lines, the plate 42 is lowered into the interior of the nozzle 14 and continues into the interior of the throat portion 37 and main combustion chamber 43. As the shaft is being extended, the expandable member 25 is being drawn away from plate 33 so as to part breakaway ties 35. When shaft 20 is fully extended, diaphragm 40 ruptures allowing plug 25 to fully expand so that the expandable member 25 occupies substantially the entire interior of the nozzle 14. In such occupation, the expandable member 25 serves as a plug which is conformal to the inner surface of the nozzle so that the throat portion 37 is completely sealed and plugged so that water or other matter cannot enter. In this fashion, the side wall of the nozzle 14 is reinforced by the pressurized expansion of the plug or member 25 and the entire assembly is made buoyant so that it will float in the water.

To avoid a bourdon tube effect, an alternate means to extend arm 19 and shaft 20 would be separate pressurization means to each member negating the requirement for diaphragms 26 and 27.

FIG. 2 also shows that a diaphragm 40 is ruptured when the pressurant is passed through the interior ducting of the column 18, arm 19 and the shaft 20. This permits the pressurant to exhaust through the pressurization ports, such as indicated by numeral 41. The plurality of pressurization ports are in fluid communication with the interior of the expandable plug or member 25. When the shaft 20 has been fully extended, the end piece 42 carrying the ports 41 resides within the rocket engine combustion chamber, identified by numeral 43.

Figure 3:
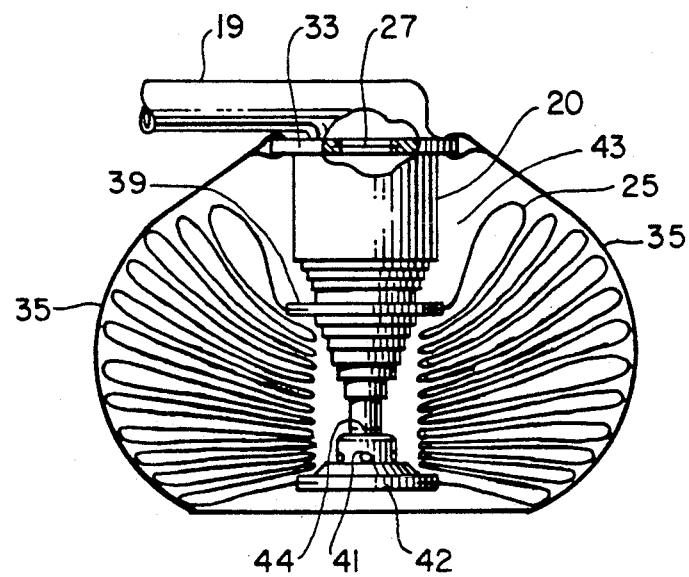
FIG. 3 is a diagrammatic view in side elevation of the expandable means carried by the recovery system of the present invention.

Referring now in detail to FIG. 3, the telescoping arm is illustrated extended with the shaft 20 in its retracted position and the midway attachment plate 39 in close proximity to the arm. The membrane or skin of the expandable member of plug 25 includes a valve 43 for relief purposes and a check valve 44 to contain internal pressure is located adjacent to the diaphragm 40 and is illustrated by the numeral 44. The throat plug 25 is illustrated in its folded and stored position with a multiplicity of folded-over convolutions so as to reduce space.

Figure 4:
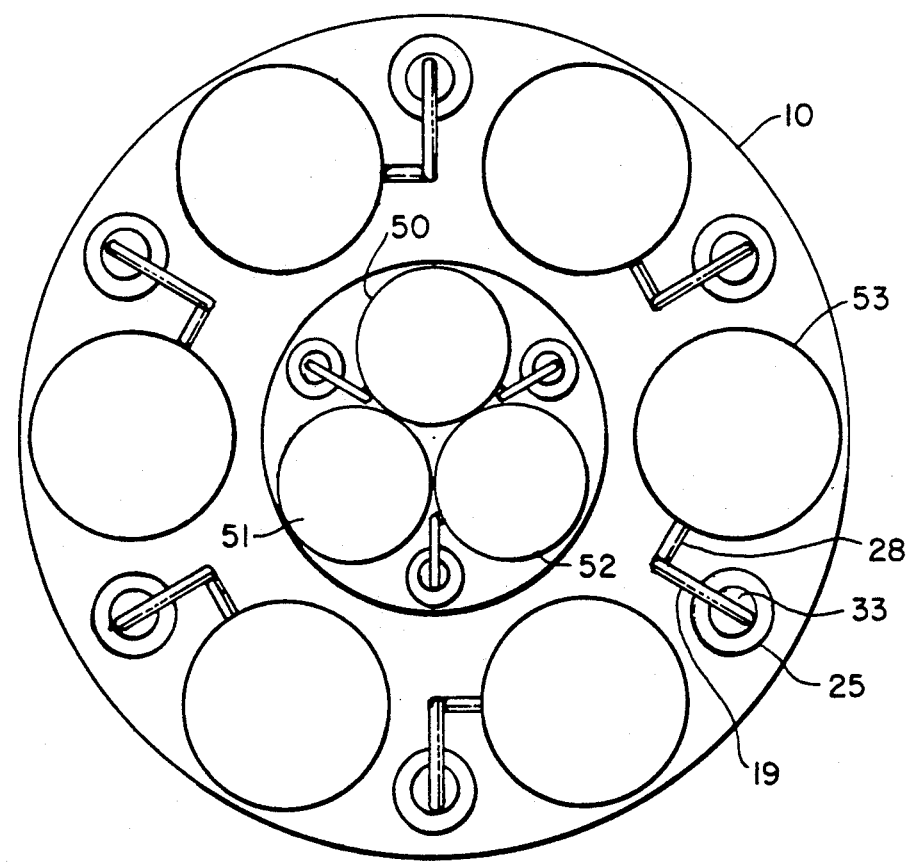
FIG. 4 is a diagrammatic plan view of the end of a space vehicle having a plurality of rocket main engines and booster engine assemblies with the novel expandable recovery means of the present invention for each apparatus.

Referring now in detail to FIG. 4, optional locations for the recovery system of the present are illustrated as being between adjacent clusters of engines. The space vehicle 10 includes a plurality of engine nozzles represented in this FIGURE by numerals 50, 51 and 52, while a plurality of booster engines are arranged coaxially with the arrangement of engine nozzles and are represented by the numeral 53. One of the inventive recovery plug assemblies is identified in connection with the booster engine 53. Mounting of the plurality of throat plug assemblies is optional as long as they are adjacent to a respective nozzle into which the plug assembly is intended to be inserted.

Therefore, from the foregoing it can be seen that the novel nozzle throat plug is intended to be used in an engine recovery situation. Deployment of the throat plug will seal the throat and engine nozzle ports so that contamination cannot enter these areas. The sensitive area of the injector assembly will therefore be completely isolated from possible contamination. The expanded throat plug will also protect the nozzle from deformation due to impact loads incurred during a parachute recovery landing.

Typically, an explosive separation of the engine assembly from the flight vehicle would occur at the time of engine burnout. All openings into the engine system, such as main fuel and oxidizer lines, gas generator and all bleed-off lines would be sealed by the use of check valves and normally closed valve assemblies. The engine would descend by parachute with the nozzle in a vertical attitude. The throat plug assembly would be program actuated by rotating the unextended telescoping columns into position by actuators 28 and 31. Pressurant in line 24 would extend the telescoping column 18 to full length. The rupture diaphragm 26 would open and allow the telescoping arm 19 to extend to full length centering the stowed throat plug 25 over the engine nozzle center line. The rupture diaphragm 27 would open and allow the telescoping extension shaft 20 to extend to full length, breaking the breakaway ties 35, placing the deflated throat plug 25 into position well inside the combustion chamber of the engine nozzle. Rupture diaphragm 40 would open and allow the pressurant to fill the deflated throat plug 25 and seal the engine combustion chamber/injector assembly and any existing gas ports in the nozzle area.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An expandable throat plug for an engine nozzle during recovery of an engine assembly comprising:
   an expandable member;
   an extendable arm having two ends and having said expandable member carried on one end thereof;
   an extendable column having opposite ends of which one end is secured to said arm end opposite to said arm end carrying said expandable member;
   actuator means operably coupled to said extendable column end opposite to its end coupled to said arm end;
   said extendable column being rotatable in response to activation of said actuator means; and
   pressurized medium source coupled to said expandable member via said extendable column and arm for extending said extendable column and expanding said expandable member from a compact storage deflated position to an expanded position.

2. The invention as defined in claim 1 including:
   an engine assembly thrust nozzle having an interior wall surface constituting an engine throat terminating in an exit opening; and
   an extendable shaft having a free end carrying said expandable member so as to deploy said member to a location within the engine thrust nozzle for expansion into its expanded position in conformity with said nozzle interior wall surface defining said engine throat to block said exit opening.

3. The invention as defined in claim 2 including:
   rupturable diaphragms arranged in series within said arm and said shaft operating in sequence in response to said pressurized medium from said pressurized medium source to expand said column, said arm, said shaft and said expandable member.

4. The invention as defined in claim 3 wherein:
   said extendable column, arm and shaft are coaxially disposed telescoping elements respectively.

5. The invention as defined in claim 4 including:
   a plurality of break-away ties disposed about said expandable member while in its compact storage deflated position and severable in response to expansion of said member to release said member to permit deployment within said nozzle to seal and close said exit opening.

6. In combination with an engine nozzle having a contoured engine throat terminating in an exhaust opening, the improvement which comprises:
   expandable means coaxially disposed with respect to said nozzle;
   deployment means carrying said expandable means for selectively positioning said expandable means into said nozzle adjacent said throat; and
   a source of pressurized medium operably coupled to said expandable means via said deployment means for selectively expanding said expandable means.

* * * * *